United States Patent
Gotwalt

[11] 3,858,495
[45] Jan. 7, 1975

[54] COOKING DEVICE

[76] Inventor: Warren P. Gotwalt, 2612 Palmeden Dr., Lakeland, Fla. 33802

[22] Filed: Dec. 4, 1972

[21] Appl. No.: 311,498

Related U.S. Application Data

[63] Continuation-in-part of Ser. No. 169,742, Aug. 6, 1971, abandoned.

[52] U.S. Cl............. 99/421 HH, 99/421 A, 99/449
[51] Int. Cl. ............................................ A47j 37/04
[58] Field of Search ............ 99/421, 339, 340, 419, 99/420, 441, 443, 445, 449; 126/9, 25, 37; 220/6, 8

[56] References Cited
UNITED STATES PATENTS

| | | | |
|---|---|---|---|
| 872,837 | 12/1907 | Mio................................. | 220/8 UX |
| 958,857 | 5/1910 | Dennis........................... | 99/449 UX |
| 2,244,935 | 6/1941 | Binger................................ | 126/9 R |
| 2,649,852 | 8/1953 | McCandless............... | 99/421 H UX |
| 2,939,384 | 6/1960 | Vinson........................... | 99/421 HH |
| 3,232,439 | 2/1966 | Dahl, Jr. ............................ | 220/8 X |
| 3,297,166 | 1/1967 | Summers.................... | 99/421 HH X |
| 3,393,822 | 7/1968 | Freeman................................ | 220/8 |
| 3,590,726 | 7/1971 | Warner............................. | 99/419 X |

*Primary Examiner*—Billy J. Wilhite
*Assistant Examiner*—Arthur O. Henderson
*Attorney, Agent, or Firm*—Stein and Orman

[57] ABSTRACT

A device to support food in a desired position relative to a fire or other heat source by which the food is cooked. A frame including at least two frame members movably connected together each having a plurality of sides, at least two of which have movable portions serving to vary the configuration or size of the frame, is positioned on a charcoal grill or in an oven and includes a plurality of correspondingly positioned notches and/or apertures designed to movably engage one or more skewers on which the food is mounted. Each frame member may be correspondingly configured and defined by at least one baseside and at least two oppositely correspondingly dimensioned mating sides wherein the shorter of said two slidingly engages the longer of the two sides on the other frame part defining said frame. The skewers may include a plurality of flats arranged thereon in spaced relation to one another and specifically configurated to prevent rotation of the food relative to the skewer upon turning of the skewer in the notches.

6 Claims, 5 Drawing Figures

Patented Jan. 7, 1975
3,858,495
2 Sheets-Sheet 1
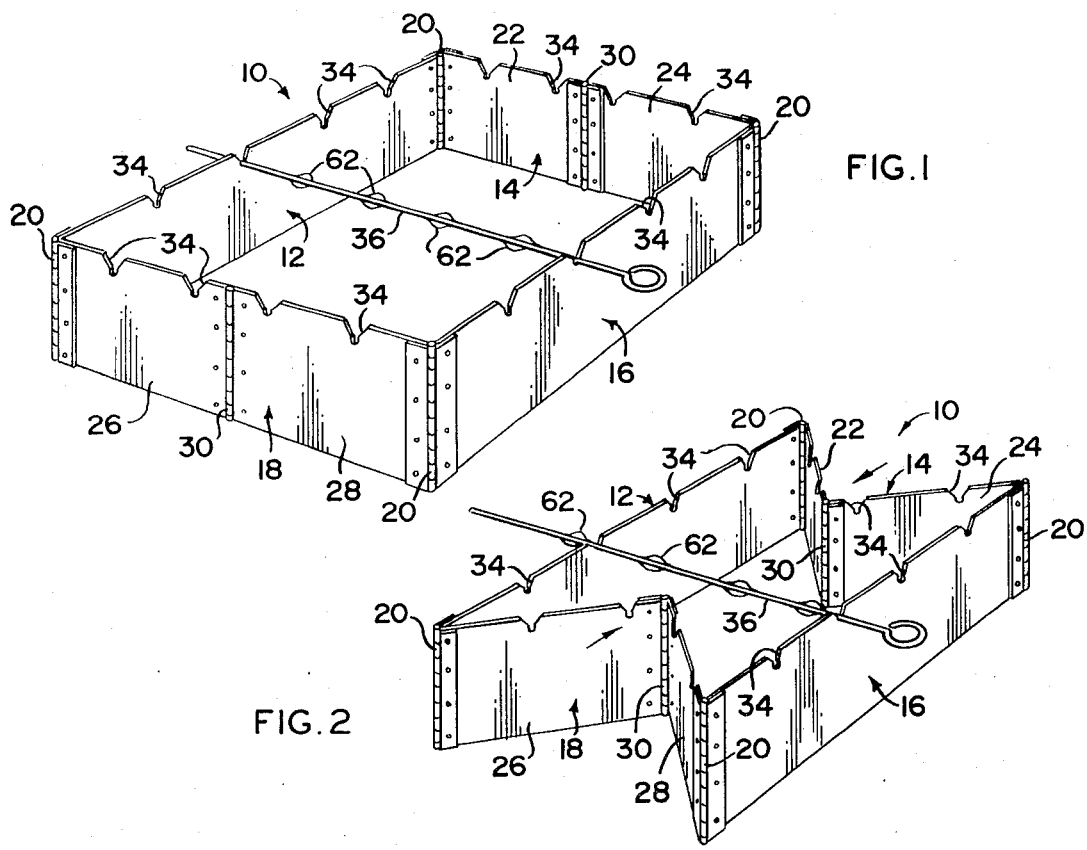
FIG. 1
FIG. 2
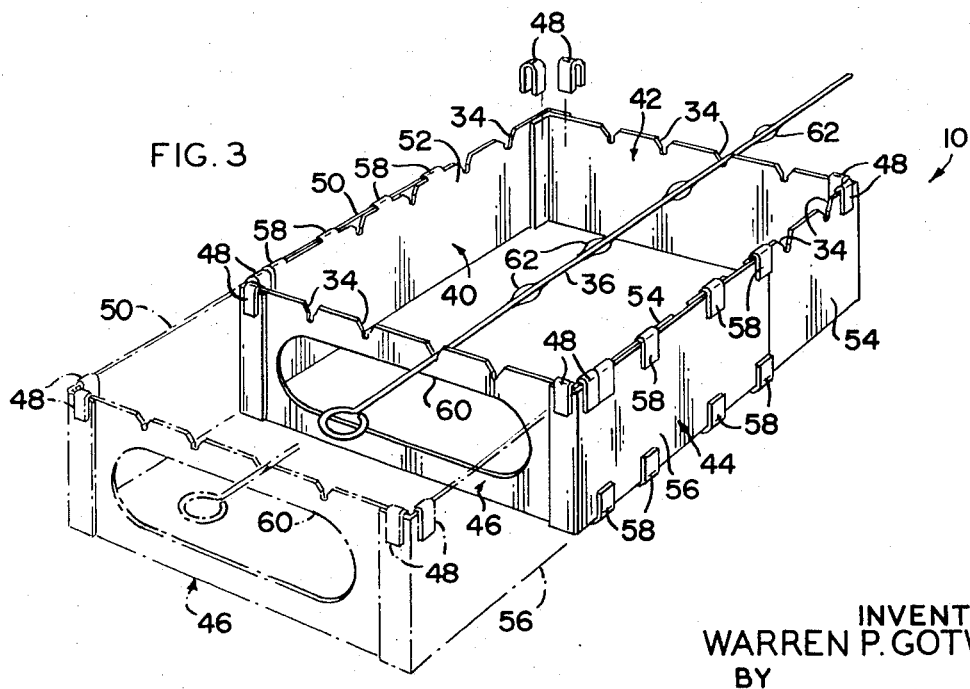
FIG. 3
INVENTOR.
WARREN P. GOTWALT
BY
*Law Offices of
Stein & Orman*
ATTORNEYS.

COOKING DEVICE

This application is a continuation-in-part application of presently co-pending application Ser. No. 169,742, filed Aug. 6, 1971, now abandoned, in the name of Warren P. Gotwalt.

BACKGROUND OF THE INVENTION

1. Field of the Invention

This invention relates to a food supporting frame comprising at least two frame members movably attached to one another and including a plurality of movably arranged sides designed to support skewer mounted food in a predetermined relation to a heat source wherein the overall configuration of the frame may be varied by movement by the sides or portions thereof relative to one another.

2. Description of the Prior Art

A number of prior art devices are presently available which are primarily designed to facilitate outdoor cooking. Most popular of course is the conventional outdoor charcoal grill whereby a heat source in the form of charcoal briquets are placed in the bottom of a metallic receptacle underneath a food supporting grill which is supported a predetermined distance from the charcoal or heat source. More sophisticated devices are now available wherein the food to be cooked is mounted on skewers, forks or the like and then positioned independently relative to the heat source or merely laid upon th grill directly.

Due to the recent popularity which outdoor cooking has enjoyed even more complicated, motorized cooking devices have been devised featuring the ability to cook a food product on all sides. This is usually accomplished by mounting the food on a skewer or fork, etc. and then coupling the skewer to the motorized rotisserie serving to rotate the skewer at a constant rate while maintaining it a predetermined distance from the heat source.

When dealing with shish-ka-bob or similar type food products, devices have been designed that simultaneously mount a plurality of skewers, bearing chunks of meat or other food products, in spaced relation to one another and to a heat source. These forks are either placed in predetermined position and rotated by hand or alternatively rotated automatically by a motorized rotisserie arrangement as described above.

In utilizing these more sophisticated devices it is clear that the additional complexity of the more modern devices greatly adds to the initial cost to the user and to the cost in maintaining these cooking utensils and devices. Also, this additional complexity usually detracts from the reliability due to the plurality of moving parts and the motorized operation.

Since prior art devices are primarily designed for outdoor use they are not intended or even capable of being used indoors with a conventional oven type broiler. Accordingly, there is a need for a low cost, relatively simple food supporting structure which can be readily adaptable both to outdoor, charcoal grill-type cooking and also indoor broilers. To accomplish these goals, while at the same time overcoming the disadvantages prevalent in prior art devices such a device should be capable of being varied in both size and configuration while at the same time effeciently positioning food products relative to a heat source. Such a device should also have the versatility of repositioning food products to accomplish best overall cooking, when the food products are mounted on skewers, forks or the like.

SUMMARY OF THE INVENTION

This invention relates to a cooking device designed to support food in a predetermined relation to a cooking heat source wherein the size and configuration of the device may be varied such that it can be used on various size outdoor grills or in cooperation with an indoor stove or oven of any practical size.

More specifically, the device comprises a frame defined by at least two frame parts wherein, in one embodiment of the present invention, each of the frame parts include a base side and at least two connecting sides. Each of the connecting sides of a frame part are dimensioned and configured to a correspoinding connecting side of the other frame part which, when connected define the frame itself. However, when joined, each of the connecting sides is specifically configured to slidingly engage the oppositely corresponding connecting side on the other frame member. This allows for more efficient and less expensive production of the frame since each of the parts from which it is formed are essentially dimensioned and configured to correspond to one another. Joining of these frame parts merely constitutes reversing their positon and slidingly engaging the opposite connecting sides of each frame member. In this embodiment, the slidingly engaging connecting sides of each frame member are telescopically arranged, since at least one connecting side of each frame member has channel means formed thereon along its upper and lower peripheral edge. Mounting means in the form of notches are arranged in spaced relation to one another on each of the corresponding sides which mate with one another so as to be aligned when the frame members are joined. This will be discussed in greater detail hereinafter. Strengthening means may also be formed in at least one of the sides to add rigidity to the frame and/or the individual side in which it is formed. Such strengthening means may be in the form of integrally formed elongated grooves extending a predetermined portion of the length of the side in which they are formed.

A modification of the embodiments set forth above comprises each of the frame members which define the frame being slidingly arranged relative to one another by a joining of the connecting side. However, the sliding arrangement is defined by a plurality of fingers integrally formed between various notches on the connecting sides wherein these notches form the mounting means to be discussed hereinafter. These fingers are configured in overlapping relation to the exterior surface of the connecting side with which it is integral. Furthermore, the base side and connecting side of each frame member are removably attached to one another by a plurality of U-shaped or applicable configured clips interconnecting overlapping portions of both the base side and connecting side at their junction.

In yet another embodiment of the present invention, each extremity of each side is hingedly connected to the correspondingly positioned extremity of the adjacently positioned sides relative to one another. Two of the sides arranged in substantially opposed relation to one another each include portions movable relative to one another by virtue of being interconnected by a pivoting means which also may take the form of a hinge. In this embodiment the correspondingly positioned end of each movable portion is pivotally connected to the adjacently positioned sides.

The present invention further includes additional features which may be common to any of the embodiments discussed above. More specifically, an aperture may be formed in at least one side of the frame wherein access may be permitted to the interior of the frame in order that the drippings of the food being cooked may be reached and used as a source of basting liquid.

Also, mounting means are formed on the frame and comprise a plurality of notches on at least two of the sides comprising the frame. The notches on each side are all arranged in a predetermiend spaced relation to one another. Similarly, the notches on the cooperatively positioned sides are correspondingly arranged to efficiently have mounted therein a food supporting means which may be in the form of a skewer or the like. Each of the notches are specifically configured to prevent inadvertent rotation of the skewer while at the same time allowing the skewer to be readily removed and/or rotated manually. In order to provide additional versatility to the subject device the notches can be arranged along the entire upper peripheral edge of the frame regardless of its configuration or size.

In addition, the mounting means may be in the form of a plurality of apertures formed in predetermined spaced relation to each other. A plurality of these apertures are formed in oppositely disposed sides of the assembled frame and each aperture of each plurality are substantially aligned such that a skewer or the like can be supported therein.

The food supporting means, which as set forth above, may be in the form of a skewer, also includes specifically configured portions which may be termed "flats" arranged in spaced relation to one another along the longitudinal axis of the skewer. These flats are provided to have chunks of meat or other food products mounted thereon and are configured to prevent the inadvertent rotation of the food relative to the skewer when the skewer itself is rotated. However, when the mounting means, in the form of apetures, are utilized, skewers not having flats formed thereon, are best utilized.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIg. 1 is a perspective view of an embodiment of the present invention in fully extended form with a food supporting means mounted thereon.

FIG. 2 is a perspective view of the device in FIG. 1 in a folded or reduced size position.

FIG. 3 is a perspective view of another embodiment of the present invention showing a plurality of positions in which the frame may be arrnaged by virtue of its parts being telescopically arranged relative to one another.

Similar reference characters refer to similar parts throughout the several views of the drawing.

DETAILED DESCRIPTION

Figure 4:
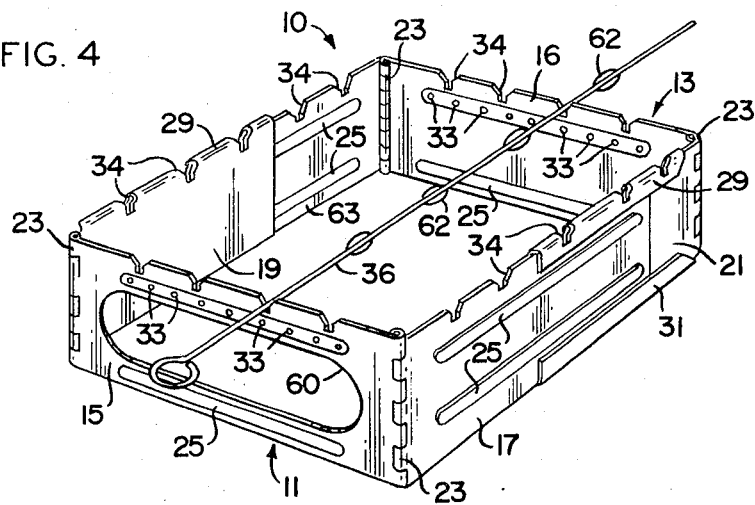
FIG. 4 is a front perspective view of one embodiment of the present invention in assembled form.

The subject invention as shown in FIGS. 1, 2 and 3 relates to a cooking device in the form of a frame generally indicated at 10.

Referring to the embodiments of FIGS. 1 and 2, the frame 10 includes a plurality of sides 12, 14, 16 and 18, each of which is movably attached to adjacently positioned sides by means of a hinge member 20 connected to each of the side extremities. The frame itself and its sides generally are arranged in a rectangular configuration but, by virtue of the hinge members 20, the shape of the frame can, of course, be varied. This allows it to be readily adaptable to any size or shape outdoor barbeque grill or indoor stove type oven.

With specific reference to FIG. 2, sides 14 and 18 each comprise a pair of movable portions 22, 24 and 26, 28 respectively. The interior ends of each portion 22, 24 and 26, 28 as shown in FIG. 2, are connected by a pivoting means which also may be in the form of a hinge 30. The opposite or outer extremities of each movable portion is connected to the hinges 20 as explained above. Movement of the movable portions in the manner shown or in any other permissible direction changes the overall configuration of frame 10 thereby adding to its versatility in allowing it to adapt to any shape or shape of outdoor grill or indoor stove.

Mounting means in the form of notches 34 are arranged along the upper peripheral edge of the frame in spaced relation to one another. It can be seen from the drawing that notches on the oppositely disposed sides of the frame are substantially aligned or arranged in corresponding position to one another such that the food supporting means 36 may be positioned to movably engage a notch of each side.

The embodiment shown in FIG. 3 also comprises a frame 10 having at least two frame parts generally indicated at 11 and 13. The frame defined by these joined frame parts 11 and 13 include a plurality of sides 40, 42, 44 and 46. Each frame part comprises removably connected sides. More specifically, frame part 11 includes connecting sides 50 and 56 and base side 46. Similarly, frame part 13 includes connecting sides 52 and 54 and base side 42. Each of these sides is capable of being detachable from the side to which it is joined by virtue of connecting means in the form of removable clips 48 interconnecting the cooperatively positioned extremities of each side. Of course, it is intended that the other type connecting means could be used to secure the sides to one another. However, by virtue of the sides being connected by virtue of removably positioned clip 48, the frame may be readily dismantled and stored. The slidingly engaged connecting sides of the joined frame parts 50, 52, and 54, 56 are movably arranged and more specifically telescopically arranged relative to one another. One or more fingers 58 are integrally formed on sides 52 and 54 so as to extend over and be slightly spaced from the outer surface of each of these sides on which it is integrally formed. These fingers thereby form oppositely disposed channels in which cooperating portions 50 and 56 respectively, are movably positioned. Accordingly, the space between opposite sides 42 and 46 can be varied upon movement of the portions 50, 52 and 54, 56 of sides 40 and 44. This, of course, varies both the size an configuration of frame 10 and, as pointed out above, allows the frame to readily adapt to any size outdoor barbeque or indoor stove.

Figure 5:
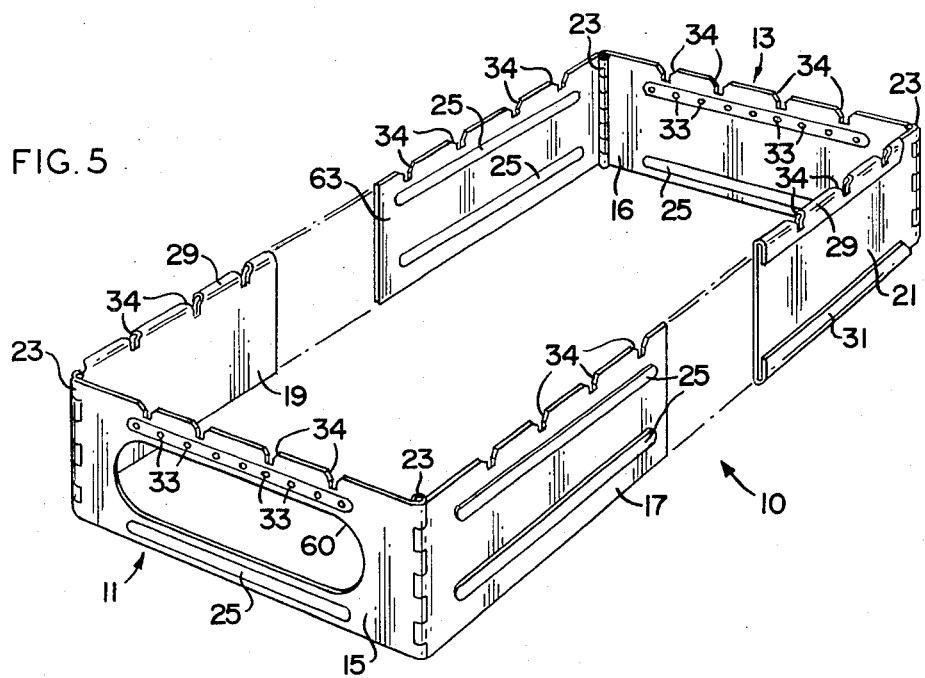
FIG. 5 is a perspective view of the embodiment shown in FIG. 4 in disassembled position.

One embodiment of the present invention is indicated in FIGS. 4 and 5 and comprises a frame means generally indicated as 10 being defined by the connecting of the two frame parts generally indicated as 11 and 13. Each of the frame parts comprises a base side 15 and 16 and connecting side 17, 19 and 21, 63 respectively, being movably or pivotally attached to the base side of each frame part by means of a hinge connector or the like 23. In addition, strengthening means 25 in the form of elongated, indented grooves integrally formed in the surface of the various sides forming the frame parts are provided to give each of the sides in which they are located, sufficient rigidity. These strengthening means 25 extent along a sufficient length of the side on which they are mounted to provide this added rigidity.

Each of the connecting sides of each part member is specifically configured and dimensioned to correspond to the oppositely located connecting side when the frame parts are connected. More specifically connecting sides 17 and 63 are produced to be essentially the same configuration and dimension, but are oppositely located when the frame parts 11 and 13 are joined. Similarly, connecting sides 19 and 21 are correspondingly dimensioned and configured, but are oppositely located when the frame parts 11 and 13 are joined to form the frame 10. In addition, the cooperating connecting sides of each frame part are cooperatively dimensioned and configured so as to provide the sliding relationship clearly shown in FIG. 4. This sliding relationship is defined by a telescopic connection between connecting sides 17 and 21 and 19 and 63 of the joined frame parts 11 and 13. Each of the connecting sides 19 and 21 of each frame part includes joining means in the form of channels defined by overlapping peripheral edges 29 and 31 which are arranged a spaced distance from the outer surface of these connecting sides to form this channel in which connecting sides 63 and 17 are slideably mounted.

The frame may further include one or more elongated aperture means 60 formed in the frame in order to permit access to the interior of the frame to obtain the natural juices from the meat being cooked. This can be used for basting or any other desirable purpose.

The food supporting means 36 may take the form of an elongated skewer member designed to movably engage correspondingly positioned notches 34 in cooperatively positioned sides, as explained above. The skewer member may also include flats 62 arranged in spaced relation along the longitudinal axis of the skewere 36. These flats are configured to prevent food product mounted thereon from inadvertently rotating relative to the skewer. This allows the skewer itself to be rotated freely and present all sides of the food product to a heat source used for cooking.

Additional mounting means in the form of a plurality of laigned apertures 33 are formed in two substantially oppositely disposed sides of the frame. These aligned said apertures are utilized to have skewers mounted therein when, for some reason, it is not convenient to use the plurality of notches 34 formed around the upper peripheral edge of the frame. When utilizing these apertures, skewers 36 without flats are preferred.

In operation, the user of the cooking device merely adjusts the size of the frame by movement of the movable portions as explained above thereby adapting it to the specific size or configuration outdoor grill, oven, or indoor stove available to the user. The food products are then placed on the skewer 36 in the typical fashion and if desirable to the particular flats 62 which prevents inadvertent movement of the food relative to the skewer, as explained above. The food bearing skewers are then placed in the correspondingly positioned notches 34 and are arranged in predetermined relation to the available heat source used for cooking.

It will thus be seen that the objects made apparent from the preceeding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Now that the invention has been described,
What is claimed is:

1. A cooking device of the type designed to support food relative to a heat source, said device comprising: frame means including at least two frame parts movably connected to one another, each frame part comprising a plurality of sides movably connected to one another, said plurality of sides comprising a base side and at least two connecting sides movably attached to said base side, one of said connecting sides of each frame part being of smaller longitudinal dimension than the other said connecting sides on said one frame part, said smaller connecting side of each frame part positioned to movably engage the larger of said connecting sides on the attached frame part; joining means in the form of channel means formed on said connecting side of smaller longitudinal dimension of each frame part, said channel means configured to slidingly engage the correspondingly positioend connecting side of the attached frame part, food supporting means movably mounted on said frame; mounting means including notches correspondingly positioend in each of said plurality of sides of each frame part, wherein said supporting means are adjustably disposed on said frame through a correspondingly positioned notch disposed on oppositely positioned side of connected frames.

2. A cooking device as in claim 1 wherein each of said connecting sides of each frame part is dimensioned and configured to substantially correspond to an oppositely located connecting side of said attached frame part.

3. A cooking device as in claim 1 wherein said food supporting means comprises at least one elongated skewer member mounted on said frame in removable engagement with said mounting means.

4. A cooking device as in claim 3 wherein said food supporting means comprises a plurality of skewers, each of which are movably mounted on said frame and each of which include a plurality of flats arranged in spaced relation to one another, whereby food mounted on each of said flats is prevented from rotating due to the configuration of said flat.

5. A cooking device as in claim 3 wherein said mounting means further comprises a plurality of apertures correspondingly positioned in aligned relation to one another in at least two of said plurality of sides which are arranged in substantially opposite relation to one another, said apertures comprising a predetermined configuration corresponding to the configuration of said food supporting means.

6. A cooking device as in claim 1 further comprising an elongated aperture formed on a base side of one frame part of said two frame parts movably connected to one another.

* * * * *